(12) United States Patent
Drogosch et al.

(10) Patent No.: US 8,457,859 B2
(45) Date of Patent: Jun. 4, 2013

(54) METHOD AND APPARATUS FOR PRESERVING BATTERY OPERATION AND LIFE DURING VEHICLE POST IDLE SHUTDOWN CONTROL

(75) Inventors: Bradley Allen Drogosch, Northville, MI (US); Anthony Dwayne Cooprider, Rochester Hills, MI (US); Karl William Wojcik, Sterling Heights, MI (US); Ronald Patrick Brombach, Plymouth, MI (US); Ryan Edwin Hanson, Livonia, MI (US); Daniel James Card, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1088 days.

(21) Appl. No.: 12/264,935

(22) Filed: Nov. 5, 2008

(65) Prior Publication Data

US 2009/0157232 A1 Jun. 18, 2009

Related U.S. Application Data

(60) Provisional application No. 61/007,716, filed on Dec. 13, 2007.

(51) Int. Cl.
*G06F 7/00* (2006.01)
*G06F 17/00* (2006.01)

(52) U.S. Cl.
USPC ............ 701/86; 701/29.7; 701/1; 713/320; 713/321; 713/323; 180/178

(58) Field of Classification Search
USPC ......... 701/1, 36, 29.7, 86; 307/10.1; 455/572, 455/574; 700/297; 180/178; 713/320–323
See application file for complete search history.

(56) References Cited

U.S. PATENT DOCUMENTS

| 4,263,579 A | * | 4/1981 | Corgan et al. ............... 340/447 |
| 4,371,051 A | * | 2/1983 | Achterholt ................... 180/271 |
| 5,243,526 A | * | 9/1993 | Ito et al. ........................ 701/90 |
| 5,256,959 A | * | 10/1993 | Nagano et al. ................ 322/25 |

(Continued)

FOREIGN PATENT DOCUMENTS

| JP | 2-127014 | * | 5/1990 |
| JP | 2009-072065 | * | 3/2009 |

OTHER PUBLICATIONS

Routing to preserve energy in ad hoc networks subject to jamming; Block, F.J.; Baum, C.W.; Military Communications Conference, 2004. MILCOM 2004. IEEE; vol. 3; Digital Object Identifier: 10.1109/MILCOM.2004.1495117 Publication Year: 2004, pp. 1213-1219 vol. 3.*

(Continued)

*Primary Examiner* — Cuong H Nguyen

(57) ABSTRACT

A method for preserving battery operation and life during vehicle post idle shutdown, such vehicle having a delayed accessory power mode operative when an ignition state of the vehicle is in a non-engine running condition while an ignition switch of the vehicle is in the ON position to supply accessories in the vehicle the battery. The method includes: detecting whether the vehicle has been in an post idle shutdown condition and brake pedal not pressed and ignition state unchanged; and placing the vehicle in the delayed accessory power mode after detecting that the vehicle has been in an post idle shutdown condition and while the ignition switch is in the ON position.

11 Claims, 3 Drawing Sheets

U.S. PATENT DOCUMENTS

| | | | | |
|---|---|---|---|---|
| 5,372,110 | A | * | 12/1994 | Boverie et al. ............ 123/339.21 |
| 5,721,935 | A | * | 2/1998 | DeSchepper et al. ......... 713/323 |
| 6,163,690 | A | * | 12/2000 | Lilja ............................. 455/574 |
| 8,340,859 | B2 | * | 12/2012 | Ito et al. ........................ 701/29.7 |
| 2004/0183374 | A1 | * | 9/2004 | Ponmalai ....................... 307/9.1 |
| 2007/0114956 | A1 | * | 5/2007 | Hashimoto ................... 318/139 |
| 2008/0042615 | A1 | * | 2/2008 | Serrels et al. ................. 320/101 |

OTHER PUBLICATIONS

Supply Voltage Adaptive Low-Power Circuit Design; Sami Kirolos; Yehia Massoud; Design, Applications, Integration and Software, 2006 IEEE Dallas/CAS Workshop on; Digital Object Identifier: 10.1109/DCAS.2006.321051; Publication Year: 2006 , pp. 131-134.*

New energy-storage unit for heavy-duty vehicles encompassing cold-weather starting; Schupbach, R.M.; Balda, J.C.; Power Electronics Specialists Conference, 2004. PESC 04. 2004 IEEE 35th Annual vol. 4; Digital Object Identifier: 10.1109/PESC.2004.1355274; Publication Year: 2004 , pp. 2786-2791 vol. 4.*

Spark-Ignition-Engine Idle Speed Control: An Adaptive Control Approach; Yildiz, Y.; Annaswamy, A.M.; Yanakiev, D.; Kolmanovsky, I.; Control Systems Technology, IEEE Transactions on; vol. 19 , Issue: 5; Digital Object Identifier: 10.1109/TCST.2010.2078818; Publication Year: 2011 , pp. 990-1002.*

An energy management system to improve electric vehicle range and performance; Pavlat, J.W.; Diller, R.W.; Aerospace and Electronic Systems Magazine, IEEE; vol. 8 , Issue: 6; Digital Object Identifier: 10.1109/62.216890 Publication Year: 1993 , pp. 3-5.*

Adaptive Battery Management Systems for the new generation of Electrical Vehicles; Danilov, D.; Notten, P.H.L.; Vehicle Power and Propulsion Conference, 2009. VPPC '09. IEEE; Digital Object Identifier: 10.1109/VPPC.2009.5289835 Publication Year: 2009 , pp. 317-320.*

Results concerning ultracapacitor-based energy management strategy within electric vehicles; Florescu, A. ; Bacha, S. ; Munteanu, I. ; Bratcu, A.I. ; Rumeau, A.; System Theory, Control and Computing (ICSTCC), 2012 16th International Conference on Publication Year: 2012 , pp. 1-7.*

Multiobjective Optimization of HEV Fuel Economy and Emissions Using the Self-Adaptive Differential Evolution Algorithm Lianghong Wu ; Yaonan Wang ; Xiaofang Yuan ; Zhenlong Chen; Vehicular Technology, IEEE Transactions on vol. 60 , Issue: 6; Digital Object Identifier: 10.1109/TVT.2011.2157186; Publication Year: 2011 , pp. 2458-2470.*

* cited by examiner

METHOD AND APPARATUS FOR PRESERVING BATTERY OPERATION AND LIFE DURING VEHICLE POST IDLE SHUTDOWN CONTROL

CROSS-REFERENCE TO RELATED APPLICATIONS

This application claims priority from U.S. Provisional application No. 61/007,716 filed Dec. 13, 2007, the entire subject matter thereof being incorporated herein by reference.

TECHNICAL FIELD

This invention relates generally to method and apparatus for preserving battery operation and life during post vehicle idle shutdown.

BACKGROUND AND SUMMARY

As is known in the art, owners and operators of large vehicle fleets invest significant amounts of operating cash in yearly fuel costs. One source of previously uncontrollable cost is fuel spent on vehicles left in an idle state while the driver is engaged in other activities. To address green house emissions, recent regulations in CARB regulated states now require vehicles over 14,000 lbs to meet certain diesel emissions standards or implement some type of idle control shutdown strategy which may include engine shutdown after certain conditions are met. One immediate problem is what to do after the vehicle engine has been shutdown. This immediate problem is associated with the fact that the vehicle ignition switch is still left in the ON or RUN position by the driver and the entire electrical system is draining the battery. If left unattended the battery would drain in as little as 2 hours and the vehicle would be unable to start. Repeated deep-cycling of the battery in such a circumstance would lead to reduced battery life and increased battery warranty. Additionally, owner/operator product dissatisfaction could be significant.

In view of the foregoing the inventors have recognized that a need exists to have a system within a vehicle that provides for simulating turning off the ignition switch even though it is still in the ON or RUN position while preserving battery life in the case where an idle shutdown strategy has been executed.

In accordance with the present invention, a method is provided for preserving battery operation and life during post vehicle idle shutdown, such vehicle having a delayed accessory power mode becoming operative when an ignition state of the vehicle is in a non-engine running condition while the ignition switch of the vehicle is in the ON or RUN position to supply accessories in the vehicle the battery. The method includes: detecting whether the vehicle has been in a post idle shutdown and the brake has not been pressed or ignition status unchanged; and then placing the vehicle in the delayed accessory power mode after detecting that the vehicle has been in a the post idle shutdown condition while the ignition switch is in the ON or RUN position.

In one embodiment, after placing the vehicle in the delayed accessory power mode after detecting that the vehicle has been in a post idle shutdown condition, the mode is returned to a previous mode in response to a vehicle operator either changing the brake pedal state or changing vehicle ignition state.

In one embodiment, the detecting uses network message information indicating engine status; brake pedal state; and ignition key position.

In one embodiment, engine state is either ON as when the engine is either running in an idle condition or OFF as when the engine is in the non-running condition.

In one embodiment, information includes door ajar signals.

Such method provides an architecturally integrated passive solution that has the advantages of meeting rigorous automotive validation standards. The solution is also designed to be "inserted" into the primary power feeds without a major disruption in existing wiring harness design and manufacturing impact. Solution enhancement of network allows for provisions to provide vehicle message such as door ajar to promote lights out feature from vehicle delay accessory providing addition battery saving capability.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
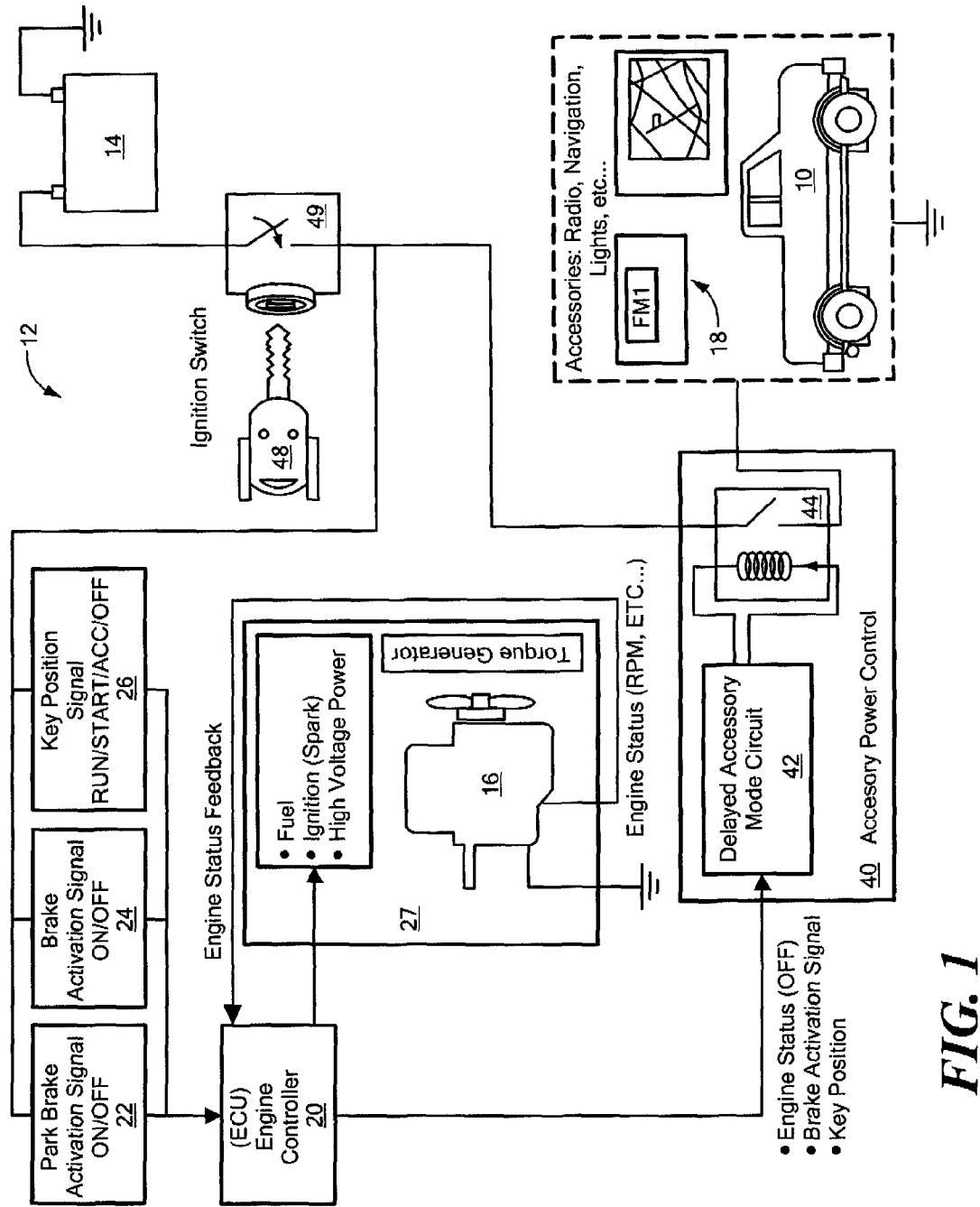
FIG. 1 is a diagram of a vehicle having apparatus for preserving battery operation and life by interruption of vehicle power during vehicle post idle shutdown.

Referring now to FIG. 1, a vehicle 10 having apparatus 12 for preserving battery 14 operation and life by interruption of vehicle power during vehicle post idle shutdown is shown. The vehicle includes an internal combustion engine 16 and various accessories 18 such as, for example, a radio, a navigating system, lights, etc. The engine 16 is controlled by an engine control unit (ECU) 20. The ECU 20 is fed in a conventional manner by, inter alia, a foot brake activation signal 24, an ignition key position RUN/START/ACCESSORY/OFF signal 26. The ECU 20 is also fed signal from an accelerator pedal position signal, not shown, parking brake signal inputs 22, as well as feedback signal information 27 from the engine 16, such as, for example, engine RPM, in a conventional manner. This feedback information is used by the ECU 20 to set an engine status signal to either an ON condition, as when the engine is operating in an idle condition or an OFF condition when the engine 16 is in a non-running condition. The ECU 20 also receives transmission position information indicating whether the transmission is in the Park or Neutral position. The engine 16 has the fuel fed thereto, ignition spark timing and high voltage power controlled by the ECU 20 in a conventional manner to produce driver demanded torque.

It is noted that the engine status signal from the ECU 20, the foot brake activation signal 24, and an ignition key position RUN/START/ACCESSORY/OFF signal 26 are also fed to an accessory power controller 40 via a conventional communication bus. The accessory power controller 40 includes conventional accessory delay mode circuit 42 used to control a relay 44. The conventional delayed accessory mode circuitry 42 enables the accessories 18 to receive power from the battery 14 for a predetermined period of time after the ignition key 48 is placed in the OFF position in a conventional manner and here, in accordance with the invention, and the delayed accessory mode circuitry 42 enables power from the battery 14 to be supplied to the accessories 18 if the engine 16 is in an idle condition with the ignition key 48 in the ON or RUN position for a predetermined period of time in a manner to be described in more detail in connection with FIGS. 2A and 2B. Suffice it to say here, however, that the relay 44 is coupled between battery the ignition switch, as shown, and the accessories 18, as shown. The relay 44 operates in response to the engine status signal, the brake activation signal 24, and the ignition key position RUN/START/ACCESSORY/OFF signal 26 in a manner described by the flowchart in FIGS. 2A and 2B to preserve battery operation and life during vehicle post idle shutdown according to the invention.

It is first noted that, as in conventional vehicles, if the ignition key 48 is in the OFF position and the engine 16 is no longer running, the accessory power controller 40 couples the battery 14 to the accessories 18 through the relay 44 using the accessory delay mode circuit 42 to supply power to the accessories 18 for a predetermined period of time. It is also noted that power can be interrupted by opening the door of the vehicle. It is also noted, as in conventional vehicles, that if the ignition key 48 is in the ACCESSORY position and the engine 16 is no longer running, the accessory power controller 40 couples the battery 14 to the accessories 18 through the relay 44 for as long as the ignition is in the ACCESSORY position.

Figure 2A:
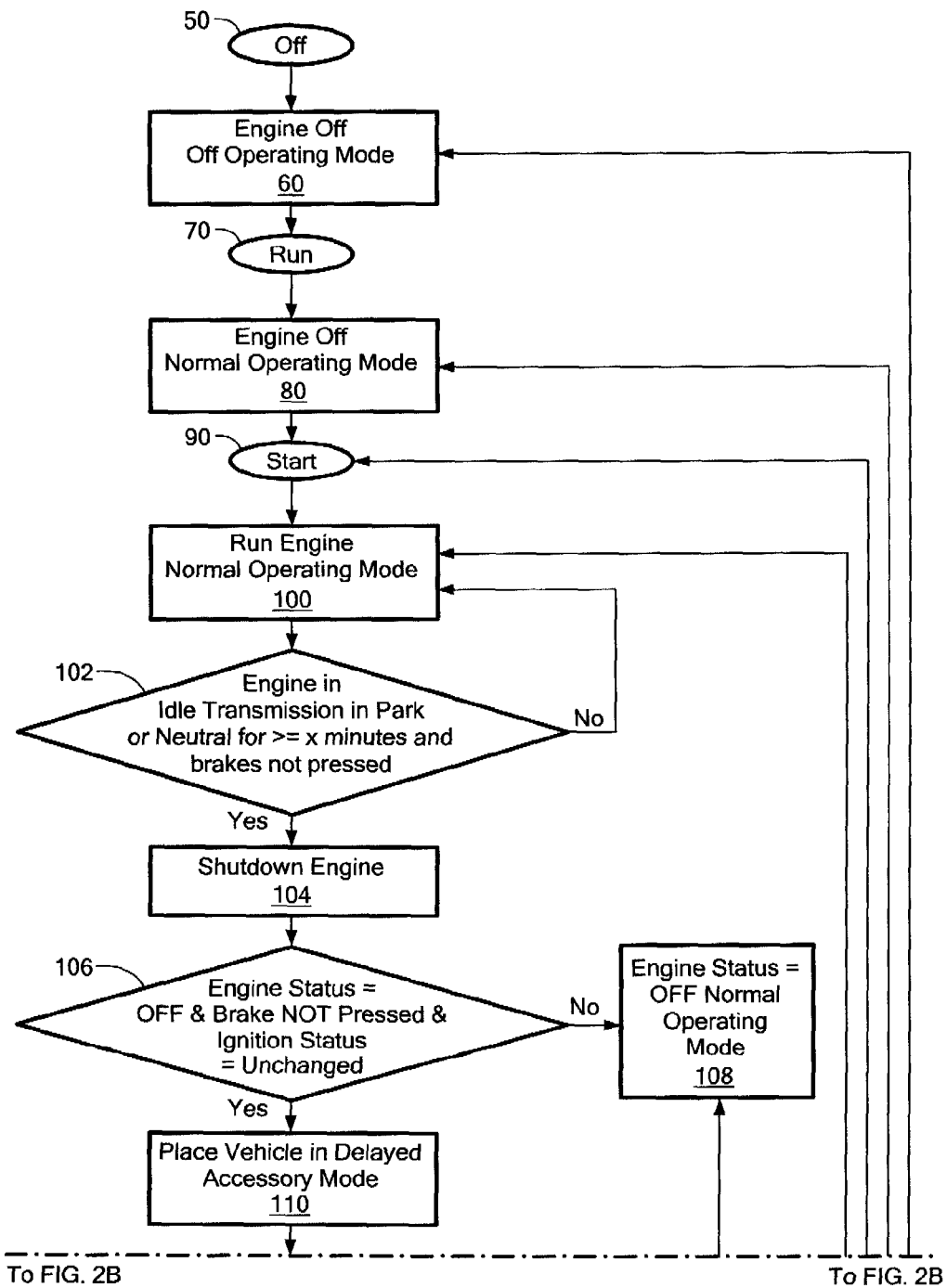
FIGS. 2A and 2B together is a flowchart of a method for preserving battery operation and life during vehicle post idle shutdown of the vehicle of FIG. 1 according to the invention.
Figure 2B:
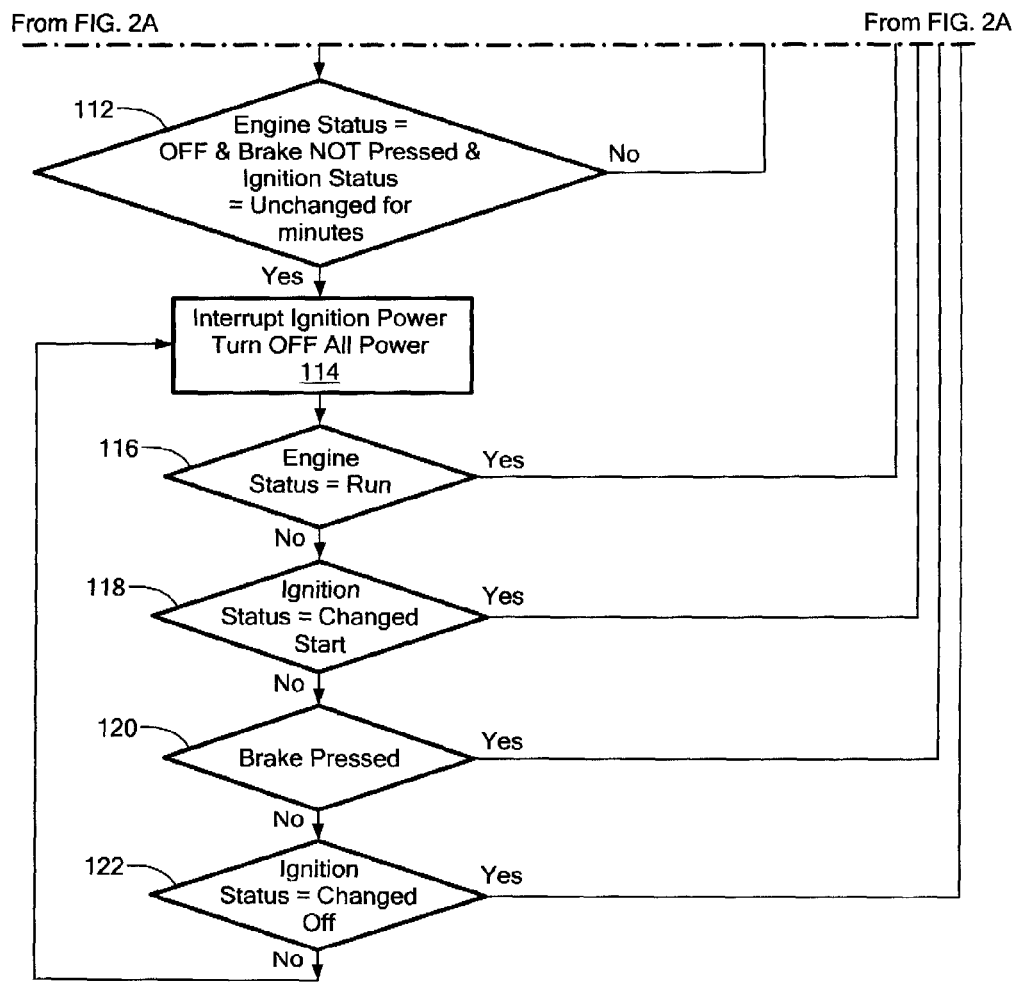

Referring now to FIGS. 2A and 2B, operation of the accessory power controller 40 in accordance with the invention is shown. Thus, in Step 100, we find the engine 16 running normally with the ignition switch in the ON position having moved from Step 90 where the engine is cranked to be started, the electrical system is under normal operating condition (that is, power is supplied to the accessories from the battery) and the ECU 20 produces, as noted above, an ON engine status signal 27. In Step 102, the ECU 20 determines from the engine status feedback signal 27 described above in connection with FIG. 1, whether the engine 16 is in idle condition for a predetermined period of time, 15 minutes for example, or whether the transmission is in anything other than Park or Neutral position and, whether the brake pedal has been pressed. If any one of these conditions is not met, the ECU 20 returns to Step 100 and continues to operate the electrical system in the normal operating mode (that is, power is supplied to the accessories from the battery); on the other hand, if the ECU determines in Step 102 that the engine 16 has been at idle for the predetermined period of time or greater, or if the transmission is in Park or Neutral position and, the brake pedal has not been pressed, the ECU 20 shuts down the engine 16 by, for example, removing fuel flow to the engine, and/or inhibiting spark to the spark plugs, and/or removing high voltage power to the engine, Step 104. Also, the ECU 20 changes the engine status signal 27 from ON to OFF, Step 104. It is noted that even though the engine 16 is shutdown by the ECU 20, the ignition key 48 is still in the ON or RUN position so that the battery 14 remains connected to the relay 44. It is also noted that during normal engine operating conditions the relay 44 is closed so that power is supplied by the battery 14 to the accessories 18.

The accessory power controller 40 (FIG. 1) monitors the engine status signal 27. If the accessory power controller 40 detects that the engine status signal 27 is in the OFF condition and if the brake pedal is not pressed and the ignition key position has not changed from the ON position, the accessory power controller 40 places the vehicle in the delayed accessory mode (Step 110) wherein power passes from the battery 14, through the ignition switch 49 (FIG. 1), which is still in the RUN or ON position, through the relay 44 to the accessories 18 for a predetermined time, Step 112. Thus, after the predetermined time from shutdown, the accessory delay mode circuit 42 opens the relay 44 and battery power is removed from the accessories 18, Step 114.

On the other hand, if in Step 106, the accessory power controller 40 does not detect that the engine status signal 27 is in the OFF condition or if the brake pedal is pressed or the ignition key position has changed from the ON position, the electrical system continues in the normal operating mode mode (that is, power is supplied to the accessories from the battery) and the relay 44 remains closed; it being noted that the ECU 20 maintains the engine status signal 27 in the OFF condition, Step 108.

With the vehicle 10 in the delayed accessory mode (Step 110), the accessory power controller 40 monitors the engine status signal 27, Step 112. If the accessory power controller 40 detects that the engine status signal 27 is in the OFF condition and if the brake pedal is not pressed and the ignition key position has not changed from the ON position for the predetermined period of time X, for example 10 minutes, the accessory power controller 40 operates the relay 44 to break the connection between the battery 14 and the accessories 18 to thereby turn off all power to the accessories 18, Step 114. At Step 114 the accessory power controller continues to monitor the engine status signal 27, the brake pedal and the ignition key position; a change in any of these states returns the electrical system to the following operating modes; if the engine status changes to RUN (Step 116) then mode is returned normal in Step 100, alternatively if the ignition switch status changes to Start (Step 18) then the mode is returned normal Step 100 via step 90 in the start event, alternatively if the brake is pressed (Step 120) the mode is returned to normal (Step 80) via step 70 (in these cases normal refers to that is, power is supplied to the accessories from the battery), finally if the ignition switch is switched to OFF (Step 122) then the mode is returned to the off (Step 50 which logically flows to Step 60). If after Step 114 the engine status signal 27 is in the ON condition, Step 116, the process returns to Step 100; otherwise, the process determines whether the ignition status was changed to START or OFF, Step 118. If the ignition status has changed to START or OFF, the process starts the engine, Step 80, and proceeds to Step 100; otherwise the process determines whether the brake has been pressed, Step 120. If the brake has been pressed, the engine status signal 27 returns to a state of OFF, Step 80; otherwise, the process determines whether the ignition status has changed, Step 122. If the ignition status has changed, the engine is turned off and the engine status signal is changed to OFF, Step 50 which flows logically to Step 60.

Thus, the vehicle has a delayed accessory power mode operative when an ignition state of the vehicle is in a non-engine running condition and with the ignition remained in the ON or RUN position to supply power to the accessories 18 from the battery 14 yet use conventional accessory delay mode circuit 42 to operate relay 44 in accordance with the invention (FIG. 2). The method provides for preserving battery operation and life during vehicle post idle shutdown, such vehicle having a delayed accessory power mode operative when an ignition state of the vehicle is in a non-engine running condition while an ignition switch of the vehicle is in the ON position to supply accessories in the vehicle the battery. The method includes: detecting whether the vehicle has been in a post idle condition condition and placing the vehicle in the delayed accessory power mode while the ignition switch is in the ON position and continuing to monitor key inputs (ignition, brake and engine status) necessary to restore electrical power to the system. After placing the vehicle in the delayed accessory power mode after detecting that the vehicle has been in a post idle shutdown condition, the mode is returned to a previous mode in response to a vehicle operator either touching a brake pedal state or changing vehicle ignition state. The detecting uses network message information via the communication bus (FIG. 1) indicating vehicle speed, brake pedal state, and vehicle ignition state input.

A number of embodiments of the invention have been described. Nevertheless, it will be understood that various modifications may be made without departing from the spirit and scope of the invention. Accordingly, other embodiments are within the scope of the following claims.

What is claimed is:

1. A method for preserving battery operation and life during vehicle post idle shutdown, such vehicle having a delayed accessory power mode operative when an ignition state of the vehicle is in a non-engine running condition while an ignition switch of the vehicle is in an ON position to supply power to accessories in the vehicle from a battery within the vehicle, such method comprising:
   detecting whether the vehicle has been in a post idle shutdown condition with a brake pedal in the vehicle not pressed, a transmission in the vehicle being in the Park or Neutral position, and with ignition state unchanged; and
   placing the vehicle in the delayed accessory mode after detecting that the vehicle has been in the post idle shutdown condition while the ignition switch is in the ON position.

2. The method recited in claim 1 wherein, after placing the vehicle in the delayed accessory power mode after detecting that the vehicle has been in the post idle shutdown condition, the mode is returned to a previous mode in response to a vehicle operator either touching the brake pedal or changing vehicle ignition state.

3. The method recited in claim 2 wherein the detecting uses network message information indicating vehicle speed, brake pedal condition, and vehicle ignition state.

4. The method recited in claim 3 wherein the information includes door ajar signals.

5. A method for preserving battery life, comprising:
   detecting in a controller of the vehicle, whether the vehicle has been placed in a non-engine running condition with an ignition switch of the vehicle in an ON position and whether, when in said condition the vehicle is unattended; and
   upon said detection, the controller interrupts ignition power within the vehicle with the ignition switch in the ON position.

6. The method recited in claim 5 wherein the when the vehicle is unattended detecting comprises detecting: whether the engine is in idle condition for a predetermined period of time; or whether a transmission in the vehicle is in Park or Neutral position; or whether a brake pedal of the vehicle has been pressed; or whether a door of the vehicle is ajar.

7. The method recited in claim 5 wherein upon said detection, the controller interrupts ignition power within the vehicle by interrupting power from a battery within the vehicle to electrical components within the vehicle.

8. The method recited in claim 5 wherein upon said detection, the controller interrupts ignition power within the vehicle by interrupting power from a battery within the vehicle to electrically operated accessories within the vehicle.

9. The method recited in claim 7 wherein the when the vehicle is unattended detecting comprises detecting: whether the engine is in idle condition for a predetermined period of time; or whether the engine a transmission in the vehicle is in Park or Neutral position; or whether a brake pedal of the vehicle has been pressed; or whether a door of the vehicle is ajar.

10. The method recited in claim 8 wherein the when the vehicle is unattended detecting comprises detecting: whether the engine is in idle condition for a predetermined period of time; or whether the engine a transmission in the vehicle is in anything other than Park or Neutral position; or whether a brake pedal of the vehicle has been pressed; or whether a door of the vehicle is ajar.

11. The method recited in claim 5 wherein upon said detection, the controller interrupts ignition power within the vehicle by interrupting power from a battery within the vehicle, though an ignition switch, to electrical components within the vehicle.

* * * * *